US012177511B1

(12) United States Patent
Hu et al.

(10) Patent No.: US 12,177,511 B1
(45) Date of Patent: Dec. 24, 2024

(54) METHOD, APPARATUS, ELECTRONIC DEVICE, AND STORAGE MEDIUM FOR VIDEO EDITING

(71) Applicant: Beijing Zitiao Network Technology Co., Ltd., Beijing (CN)

(72) Inventors: Lingxin Hu, Beijing (CN); Ruiting Chen, Beijing (CN); Fan Wu, Beijing (CN); Jihao Huang, Beijing (CN); Haowen Zheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/389,739

(22) Filed: Dec. 19, 2023

Related U.S. Application Data

(63) Continuation of application No. PCT/CN2023/138590, filed on Dec. 13, 2023.

(30) Foreign Application Priority Data

Jun. 26, 2023 (CN) .......................... 202310763607.4

(51) Int. Cl.
*H04N 21/431* (2011.01)
*G06F 40/186* (2020.01)
*G11B 27/036* (2006.01)
*H04N 5/93* (2006.01)
*H04N 9/87* (2006.01)
*H04N 21/488* (2011.01)

(52) U.S. Cl.
CPC ....... *H04N 21/4316* (2013.01); *G06F 40/186* (2020.01); *G11B 27/036* (2013.01); *H04N 5/9305* (2013.01); *H04N 9/8715* (2013.01); *H04N 21/4884* (2013.01)

(58) Field of Classification Search
CPC ... G06F 3/048; G06F 40/186; H04N 21/4316; H04N 21/4884; H04N 5/9305; H04N 9/8715; G11B 27/036
See application file for complete search history.

(56) References Cited

U.S. PATENT DOCUMENTS 5,999,190 A * 12/1999 Sheasby .................. G06T 11/00
345/589
6,745,238 B1 * 6/2004 Giljum .................. G06F 16/958
707/999.102

(Continued)

FOREIGN PATENT DOCUMENTS

| CN | 111475065 A | 7/2020 |
| CN | 111866404 A | 10/2020 |
| CN | 114756695 A | 7/2022 |

*Primary Examiner* — Patrick F Riegler

(57) ABSTRACT

Embodiments of the present disclosure a video editing method and apparatus, an electronic device, and a storage medium. The method comprises: in response to the triggering operation on a text editing track segment in an editing track on a video editing interface, presenting a first text editing interface which is of the text editing track segment and comprises a text effect preview area, a text template selection area and a first text effect editing area; in response to an operation of selecting a target text template, placing a corresponding text material in the text editing track segment, and present a first text effect of the corresponding text material in the text effect preview area.

18 Claims, 7 Drawing Sheets

(56) References Cited

U.S. PATENT DOCUMENTS

| | | | |
|---|---|---|---|
| 6,826,727 B1* | 11/2004 | Mohr | G06F 40/103 715/235 |
| 7,404,141 B1* | 7/2008 | Giljum | G06F 16/958 715/229 |
| 10,109,092 B1* | 10/2018 | Hitchings, Jr. | G06T 11/60 |
| 2003/0193502 A1* | 10/2003 | Patel | G06T 11/206 345/440 |
| 2004/0001079 A1* | 1/2004 | Zhao | G11B 27/034 |
| 2004/0184103 A1* | 9/2004 | Kremer | B41J 13/00 358/1.11 |
| 2005/0184999 A1* | 8/2005 | Daioku | H04M 1/72436 345/589 |
| 2006/0159414 A1* | 7/2006 | Wolf | G11B 27/034 386/285 |
| 2008/0307310 A1* | 12/2008 | Segal | G06Q 30/02 715/723 |
| 2009/0063517 A1* | 3/2009 | Wright | G06F 16/54 |
| 2009/0300526 A1* | 12/2009 | Port | G06Q 30/02 715/764 |
| 2010/0070850 A1* | 3/2010 | Yamaji | G06Q 10/107 709/206 |
| 2010/0080528 A1* | 4/2010 | Yen | G11B 27/34 386/278 |
| 2011/0090229 A1* | 4/2011 | Bacus | G06F 40/109 345/467 |
| 2011/0276881 A1* | 11/2011 | Keng | G11B 27/034 715/723 |
| 2012/0139940 A1* | 6/2012 | Chavanne | G06F 16/95 345/629 |
| 2014/0193047 A1* | 7/2014 | Grosz | G06Q 10/10 382/118 |
| 2015/0346938 A1* | 12/2015 | Gerhardt | G06Q 30/0276 715/723 |
| 2016/0197858 A1* | 7/2016 | Cha | H04L 51/02 709/206 |
| 2017/0017987 A1* | 1/2017 | Thomas | H04N 5/783 |
| 2017/0132200 A1* | 5/2017 | Noland | G06F 40/186 |
| 2017/0337159 A1 | 11/2017 | Hiraishi et al. | |
| 2018/0103000 A1* | 4/2018 | Guthery | G06Q 20/26 |
| 2018/0309801 A1* | 10/2018 | Rathod | H04M 3/5175 |
| 2018/0359430 A1* | 12/2018 | Sasaki | H04N 5/272 |
| 2019/0104259 A1* | 4/2019 | Angquist | G11B 27/34 |
| 2019/0379943 A1* | 12/2019 | Ayala | H04N 21/4884 |
| 2019/0386951 A1* | 12/2019 | Uhll | G06F 3/048 |
| 2020/0159871 A1* | 5/2020 | Bowen | G06T 11/60 |
| 2020/0336795 A1* | 10/2020 | Ayala | G11B 27/34 |
| 2021/0126883 A1* | 4/2021 | Choi | G06F 3/0484 |
| 2021/0258511 A1* | 8/2021 | Goodrich | H04L 51/10 |
| 2021/0304797 A1* | 9/2021 | Kim | H04N 5/272 |
| 2022/0138402 A1* | 5/2022 | Kraus | G06N 3/08 715/269 |
| 2022/0335701 A1* | 10/2022 | Oh | H04N 13/106 |
| 2022/0360741 A1* | 11/2022 | Hanton | G06T 5/50 |
| 2022/0374139 A1* | 11/2022 | Wehrman | G11B 27/34 |
| 2024/0087204 A1* | 3/2024 | Mashrabov | H04L 51/10 |

\* cited by examiner

METHOD, APPARATUS, ELECTRONIC DEVICE, AND STORAGE MEDIUM FOR VIDEO EDITING

CROSS-REFERENCE TO RELATED APPLICATION(S)

This application claims priority to Chinese Application No. 202310763607.4 filed Jun. 28, 2023, the disclosures of which are incorporated herein by reference in their entities.

FIELD

Embodiments of the present disclosure relate to video processing technologies, and particularly to method, apparatus, electronic device and storage medium for video editing.

BACKGROUND

Video has become an important medium for social intercourse and information dissemination in the network, and can be created and edited through a video editing tool.

In a relevant scheme, when video editing is performed on a mobile end, a text editing operation is involved. Text editing may generally be performed using a text template provided in the video editing tool, and may include but not limited to adjusting the text style and text font, and then adding the edited text to the video. However, it is found in actual text editing that certain text editing skills are needed to achieve a better text effect. The text might need to be modified repeatedly if there are not such certain skills, thereby causing a long text editing operation path and a low text editing efficiency.

SUMMARY

The present disclosure provides a video editing method and apparatus, an electronic device, and a storage medium to improve the efficiency of editing a text material in a text template while ensuring a high distribution efficiency of the text templates.

In a first aspect, embodiments of the present disclosure provide a video editing method comprising:

in response to a triggering operation on a text editing track segment in an editing track on a video editing interface, presenting a first text editing interface of the text editing track segment: wherein the first text editing interface comprises a text effect preview area, a text template selection area and a first text effect editing area: the text template selection area is used for presenting text template options, the first text effect editing area is used for presenting first text effect editing options, and the text effect preview area is used for presenting a text effect of the text template:

in response to an operation of selecting a target text template in the text template selection area, placing a text material corresponding to the target text template in the text editing track segment, and presenting a first text effect of the text material corresponding to the target text template in the text effect preview area;

in response to the editing operation on the target text template in the first text effect editing area, adjusting the first text effect of the text material corresponding to the target text template placed on the text editing track segment, and presenting, in the text effect preview area, a second text effect after adjustment of the first text effect of the text material corresponding to the target text template.

In a second aspect, embodiments of the present disclosure provide a video editing apparatus comprising:

a presentation module configured to, in response to a triggering operation on a text editing track segment in an editing track on a video editing interface, present a first text editing interface of the text editing track segment: wherein the first text editing interface comprises a text effect preview area, a text template selection area and a first text effect editing area: the text template selection area is used for presenting text template options, the first text effect editing area is used for presenting first text effect editing options, and the text effect preview area is used for presenting a text effect of the text template;

a template selection module configured to, in response to an operation of selecting a target text template in the text template selection area, place a text material corresponding to the target text template in the text editing track segment, and present a first text effect of the text material corresponding to the target text template in the text effect preview area;

an adjustment module configured to, in response to the editing operation on the target text template in the first text effect editing area, adjust the first text effect of the text material corresponding to the target text template placed on the text editing track segment, and present, in the text effect preview area, a second text effect after adjustment of the first text effect of the text material corresponding to the target text template.

In a third aspect, embodiments of the present disclosure further provide an electronic device comprising:

one or more processors;

a storage device for storing one or more programs, the one or more programs, when executed by the one or more processors, cause the one or more processors to execute the video editing method according to the first aspect of the present disclosure.

In a fourth aspect, embodiments of the present disclosure further provide a storage medium containing computer-executable instructions which, when executed by a computer processor, execute the video editing method according to the first aspect of the present disclosure.

According to embodiments of the present disclosure, in response to triggering operation on the text editing track segment in the editing track on the video editing interface, the first text editing interface which is of the text editing track segment and comprises the text effect preview area, the text template selection area and the first text effect editing area is presented, wherein the text template selection area is used for presenting text template options, the first text effect editing area is used for presenting first text effect editing options, and the text effect preview area is used for presenting text effects of the text template: in response to the operation of selecting the target text template in the text template selection area, the text material corresponding to the target text template is placed in the text editing track segment, and the first text effect of the text material corresponding to the target text template is presented in the text effect preview area: in response to the editing operation on the target text template in the first text effect editing area, the first text effect of the text material corresponding to the target text template placed on the text editing track segment is adjusted, and the second text effect after adjustment of the first text effect of the text material corresponding to the target text template is presented in the text effect preview area. With the selection of the text template and the editing process of partial text effects being performed in the first text editing interface in a fused manner, when the text effect meets the requirements and finer text effect editing needn't be performed, the text material on the text editing track may be directly used for video generation, and it is unnecessary to jump to other editing interfaces to edit the text effect, thereby reducing the operation path of text editing, improving quick editing of the text effect of the text material while ensuring the high distribution efficiency of the text templates, and improving the efficiency of video clipping at the mobile end.

It should be understood that the description herein is not intended to identify key or critical features of the embodiments of the disclosure or to limit the scope of the present disclosure. Other features of the present disclosure will become readily apparent from the following description.

BRIEF DESCRIPTION OF THE DRAWINGS

The above and other features, advantages, and aspects of embodiments of the present disclosure will become more apparent with reference to the following figures and detailed embodiments. Throughout the figures, the same or similar reference numerals indicate the same or similar elements. It should be understood that the figures are diagrammatic and that elements are not necessarily drawn to scale.

DETAILED DESCRIPTION OF EMBODIMENTS

Figure 1:
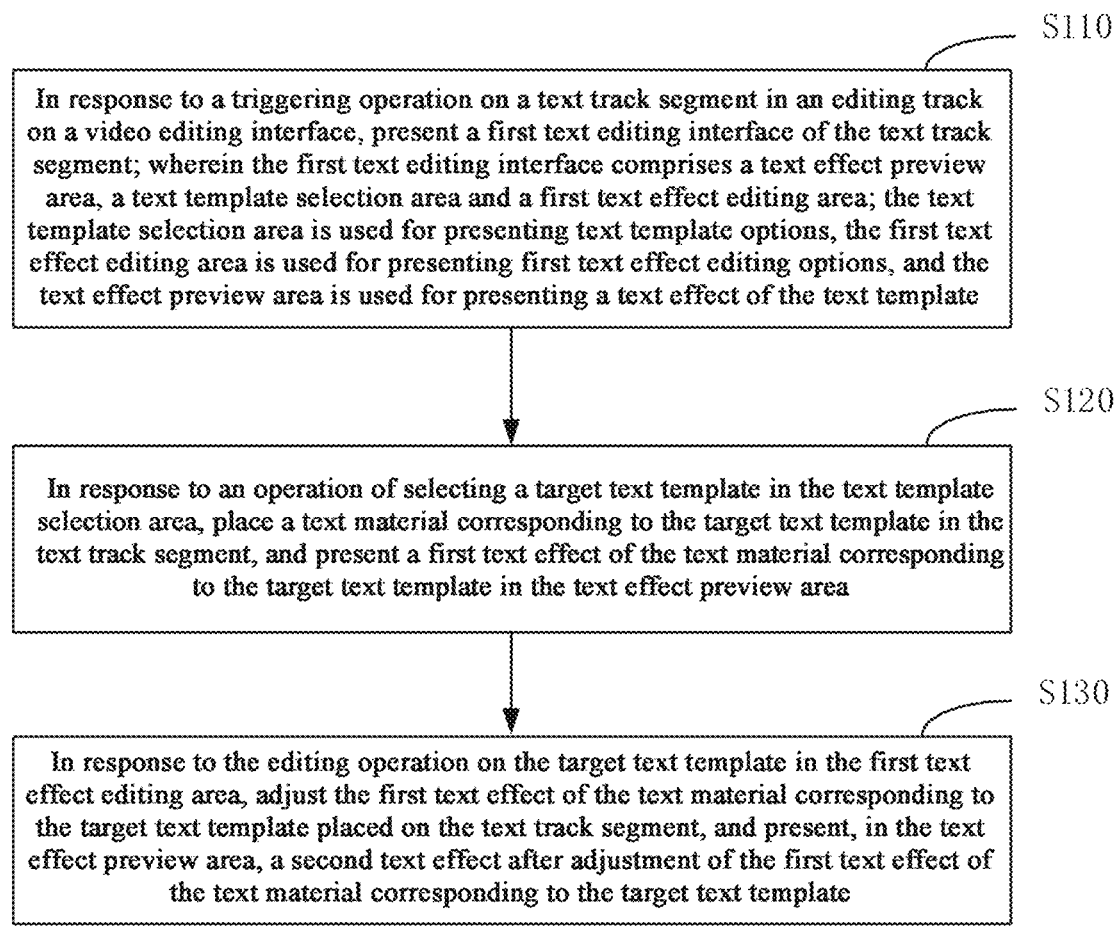
FIG. 1 is a flow chart of a video editing method provided by an embodiment of the present disclosure.

Hereinafter, embodiments of the present disclosure will be described in more detail with reference to the accompanying drawings. While certain embodiments of the present disclosure have been illustrated in the accompanying drawings, it is to be understood that the disclosure may be embodied in various forms and should not be construed as being limited to the embodiments set forth herein: rather, these embodiments are provided to help understand the present disclosure more thoroughly and completely. It should be understood that the drawings and examples of the present disclosure are for illustrative purposes only and are not intended to limit the scope of the present disclosure.

It should be understood that the various steps recited in method embodiments of the present disclosure may be performed in a different order and/or in parallel. Moreover, the method embodiments may comprise additional steps and/or omit performing the steps shown. The scope of the present disclosure is not limited in this respect.

As used herein, the terms "comprise", and variations thereof are open-ended terms, i.e., "comprise, but not limited to". The term "based on" is "based, at least in part, on". The term "one embodiment" means "at least one embodiment": the term "another embodiment" means "at least one further embodiment": the term "some embodiments" means "at least some embodiments". Relevant definitions of other terms will be given in the following description.

It should be noted that concepts such as "first" and "second" mentioned in the present disclosure are only intended to distinguish between different devices, modules, or units and are not intended to limit the order or interdependence of the functions performed by the devices, modules, or units.

It needs to be appreciated that the modifiers "a (or an)" and "a plurality of" in the present disclosure are intended to be illustrative and not restrictive, and those skilled in the art should understand that the modifiers should be understood as "at least one" unless the context clearly indicates otherwise.

The names of messages or information interacted between devices in embodiments of the present disclosure are for illustrative purposes only and are not intended to limit the scope of such messages or information.

It should be understood that prior to using the technical solutions disclosed in the various embodiments of the present disclosure, the user should be informed of the type, scope of use, use scenario, etc. of personal information involved in the present disclosure and authorization should be gained from the user in an appropriate manner according to relevant laws and regulations.

For example, in response to receiving a user's active request, prompt information is sent to the user to explicitly prompt the user that the operation requested to be performed will require obtaining and using the user's personal information. Accordingly, the user may decide autonomously whether to provide personal information to software or hardware according to the prompt information, such as an electronic device, an application, a server or a storage medium, which executes the operation of the technical solution of the present disclosure.

As an optional but non-limiting implementation, in response to receiving the user's active request, the prompt message may be sent to the user, for example, in the form of a pop-up window in which the prompt message may be presented in text. In addition, the pop-up window may also carry a selection control for the user to select "agree" or "disagree" to provide personal information to the electronic device.

It is to be understood that the above-described process of notifying the user and obtaining authorization from the user is merely illustrative and not intended to limit implementations of the present disclosure, and that other ways of satisfying relevant laws and regulations may also be applied to implementations of the present disclosure.

It is to be understood that the data involved in this technical solution (including but not limited to the data itself and the acquisition or use of the data) shall comply with the requirements of relevant laws and regulations and relevant provisions.

FIG. 1 is a flow chart of a video editing method provided by an embodiment of the present disclosure. Embodiments of the present disclosure are applicable to a case of adding text caption to a video material for video clipping. The method may be executed by a video editing apparatus, the apparatus may be implemented in the form of software and/or hardware, the video editing apparatus may be configured and implemented in any electronic device with a network communication function, and the electronic device may be a mobile end, a PC terminal or a server, etc.

As shown in FIG. 1, the video editing method of the present embodiment may include the following steps S110-S130:

S110: in response to a triggering operation on a text editing track segment in an editing track on a video editing interface, presenting a first text editing interface of the text editing track segment: wherein the first text editing interface comprises a text effect preview area, a text template selection area and a first text effect editing area: the text template selection area is used for presenting text template options, the first text effect editing area is used for presenting first text effect editing options, and the text effect preview area is used for presenting a text effect of the text template.

Figure 2:
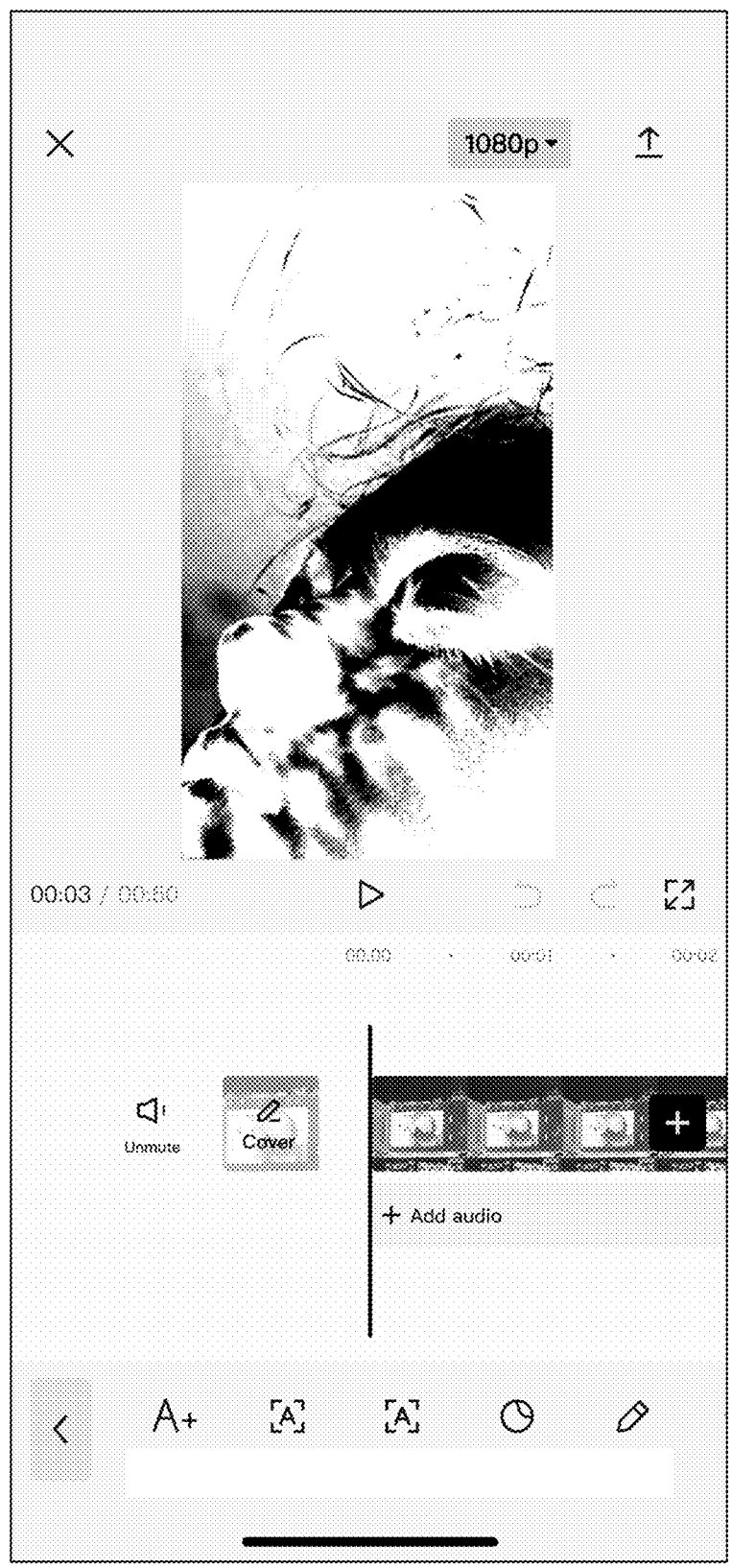
FIG. 2 is a schematic diagram of an editing track interface to which embodiments of the present disclosure are applicable.

Referring to FIG. 2, a video editing interface presents an editing track, and a video editing track segment comprising a video material is presented on the editing track. In a case where video clipping need to be performed to realize text editing, a triggering operation of the text editing track segment may be performed on the editing track, thereby triggering a text editing task on a video material corresponding to the video editing track segment on the editing track. The text editing task is to add text to the video material corresponding to the video editing track segment and to impart an appropriate text effect to the text.

Figure 3:
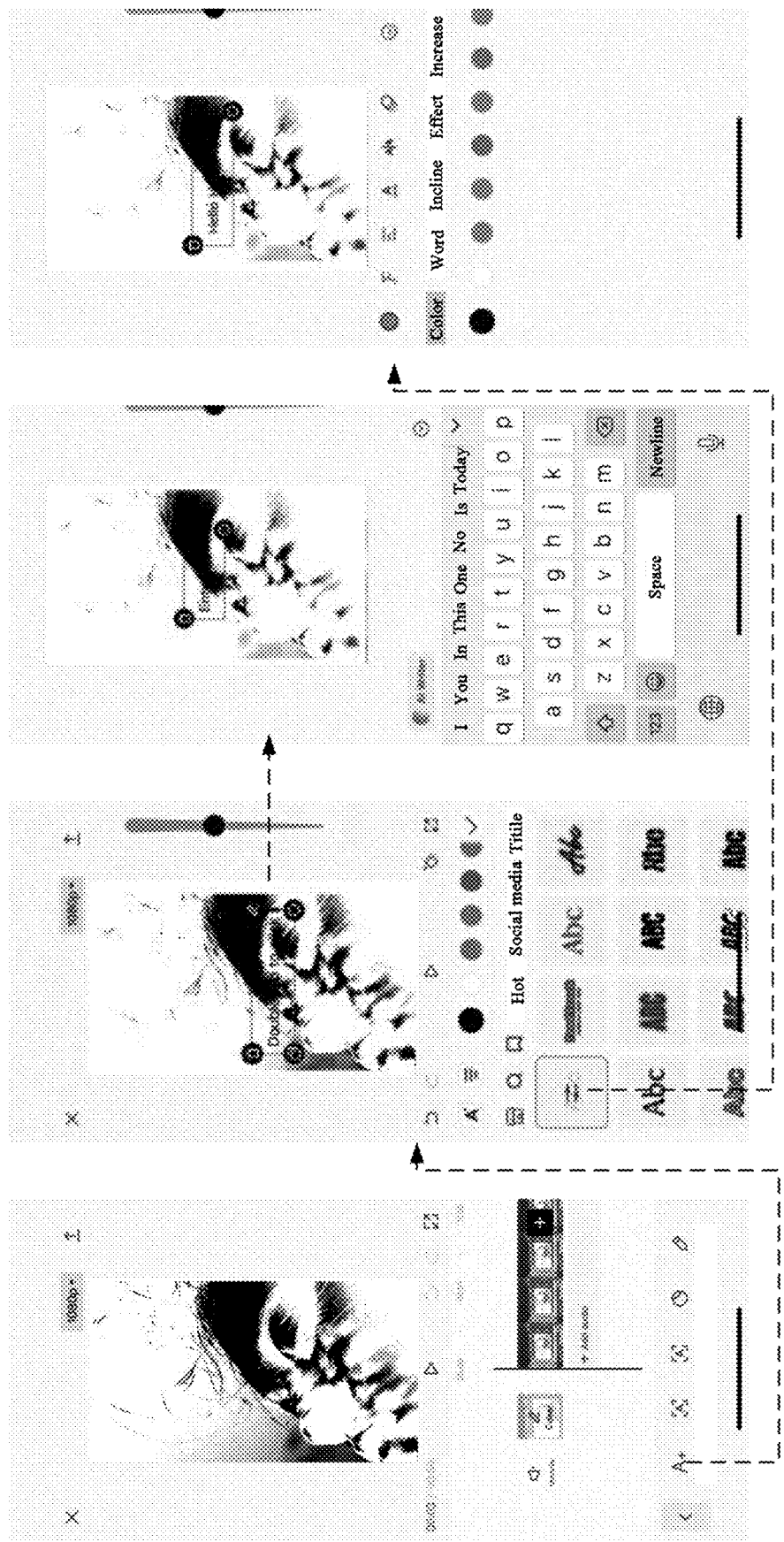
FIG. 3 is a schematic diagram showing transition of a video editing interface to which embodiments of the present disclosure are applicable.
Figure 4:
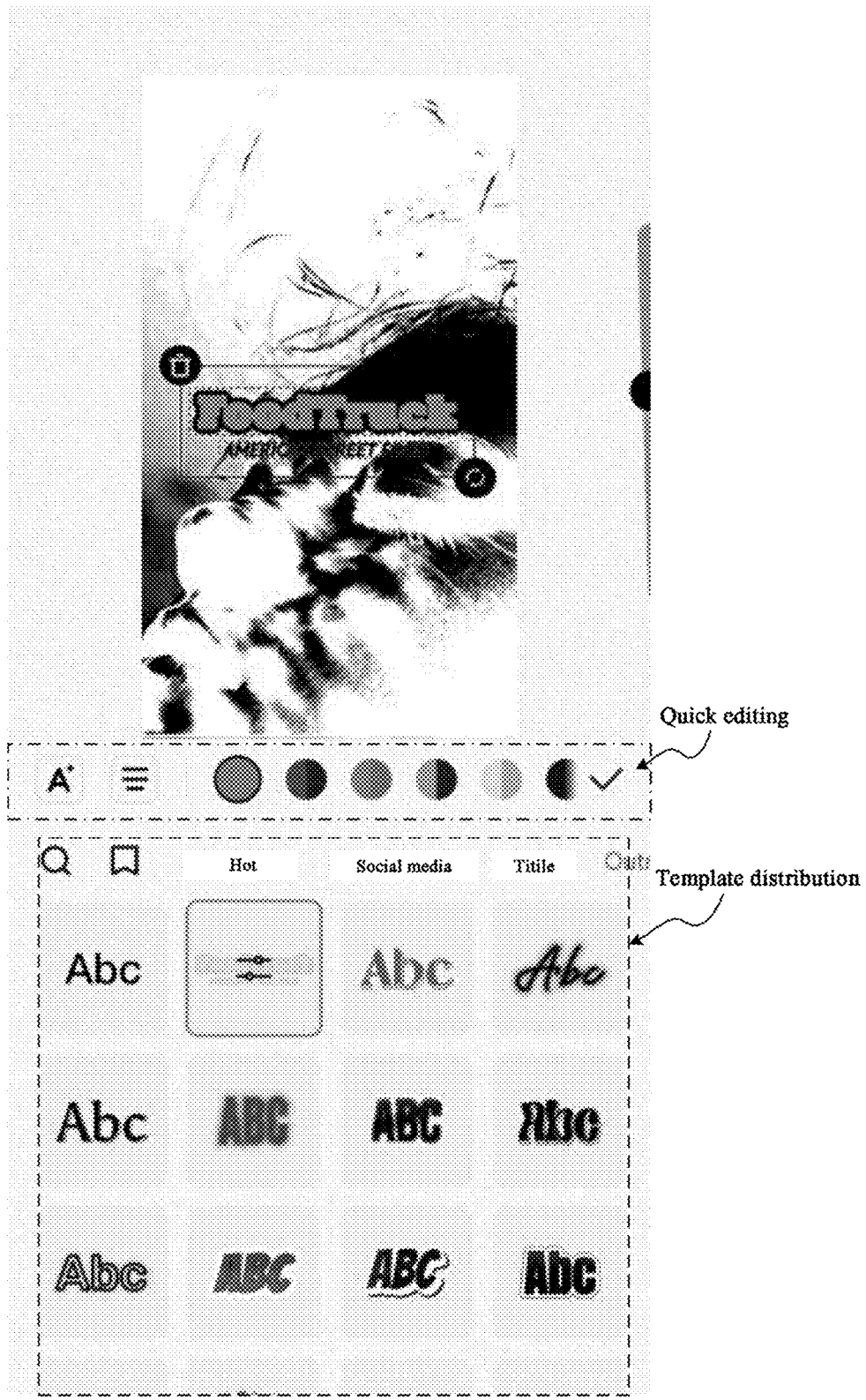
FIG. 4 is a schematic diagram of an interface for selecting a text template and achieving quick editing of the text in a video editing process to which embodiments of the present disclosure are applicable.

Referring to FIG. 3, after the triggering operation is performed on the text editing track segment in the editing track, a first text editing interface for performing the text editing task for the text editing track segment may be presented to enable a transition from the video editing interface to the first text editing interface of the text editing track segment. Referring to FIG. 4, the first text editing interface comprises a text effect preview area for performing text effect presentation for a text material corresponding to a text template, a text template selection area for presenting a plurality of text template options for text template distribution, and a first text effect editing area for achieving quick editing selection for part of first text effect editing options.

The above solution may enable setting the selection of text templates and performing quick editing processing of the text material corresponding to the selected text template on the first text editing interface, so that the distribution and selection of the text templates and the quick editing process of partial text effects are merged into one editing interface. After the text template is selected, it is unnecessary to jump to the editing interface to purposely edit the text effect, thereby preventing the editing operation path of the text effect from becoming longer and improving quick editing of the text while ensuring the high distribution efficiency of the text templates.

As an optional but non-limiting implementation, the triggering operation on a text editing track segment in an editing track on a video editing interface is specifically an operation of triggering a new text creation operation to create a blank text editing track segment on the video editing interface.

Referring to FIG. 2, optionally, when entering into the video editing interface for video clipping, a text addition identifier may be presented on the video editing interface. For example, the text addition identifier may be presented at a lower position of the editing track interface. The text addition identifier may be triggered. By triggering the text addition identifier (for example, clicking the identifier to trigger), a task for performing text editing on the video material corresponding to the video editing track segment of the video editing interface may be created, thereby triggering the operation of creating a blank text editing track segment through the new text creation operation on the video editing interface.

Referring to FIG. 2, optionally, when entering into the video editing interface for video clipping, a video editing track segment is presented on the video editing interface, a video material is carried on the video editing track segment, and a text editing track segment addition identifier may be presented at a position adjacent to the video editing track segment, for example, the text editing track segment addition identifier may be presented at a lower position of the video editing track segment. By triggering the text editing track segment addition identifier (e.g., by clicking to trigger), it is possible to create the text editing track segment for carrying a text material with respect to the video editing track segment of the video editing interface, and thereby triggering, on the video editing interface, an operation of creating a blank text editing track segment through the new text creation operation.

As another optional but non-limiting implementation, the triggering operation on a text editing track segment in an editing track on a video editing interface is specifically an operation of triggering an already-existing text editing track segment on the video editing interface to perform text editing.

Optionally, when entering into the video editing interface for video clipping, a video editing track segment is presented on the editing interface, a video material is carried on the video editing track segment, and a text editing track segment for carrying a text material is presented at a position adjacent to the video editing track segment. Regarding the already-existing text editing track segment, by selecting and triggering the text editing track segment, an operation of text editing may be triggered on the basis of the text editing track segment so as to add text material on the text editing track.

As an optional but non-limiting implementation, the video editing method of the present embodiment further comprises:

in response to an operation of adjusting the text editing track segment in the editing track on the video editing interface, adjusting a text editing track starting point and a text editing track ending point corresponding to the text editing track segment.

Referring to FIG. 2, regarding the video material corresponding to the video editing track segment, a suitable text material needs to be added as a text caption with reference to content to be conveyed by the video material to enable the video material to match the text material on the text editing track segment. To this end, the text editing track segment for carrying the text material and the video editing track segment corresponding to the video material need to be adjusted by aligning. The alignment of the text editing track segment and the suitable video editing track segment is achieved by adjusting the starting point and ending point of the text editing track segment.

Optionally, in the editing track displayed by an edit editing track page, the text editing track segment of the editing track may be triggered to perform a text editing track segmenting and editing operation. As such, the text editing track segment may be segmented into a series of small text editing track segments, such that the triggering operation is performed for each sub-text editing track segment to present a first text editing interface of each small text editing track segment, and an indicator for indicating segmentation of text editing track segments has already been performed for the text editing track segment is presented on the text editing track segment.

S120: in response to an operation of selecting a target text template in the text template selection area, placing the text material corresponding to the target text template in the text editing track segment, and presenting a first text effect of the text material corresponding to the target text template in the text effect preview area.

Referring to FIG. 4, at least two text template options are presented in the text template selection area, wherein each text template option corresponds to a text template, and each text template is associated with a text material; a target text template corresponding to the target text template option may be selected by triggering the target text template option in the text template selection area (including but not limited to clicking and dragging to a specified selected area, etc.). After the target text template is selected, the text material corresponding to the selected target text template may be pulled, and the text material is placed on the text editing track segment for carrying. Meanwhile, the text material corresponding to the target text template may also be presented in the text effect preview area according to the first text effect carried by the text material itself. The text template style may be switched and typeset by selecting each text template option in the text template selection area.

S130: in response to the editing operation on the target text template in the first text effect editing area, adjusting the first text effect of the text material corresponding to the target text template placed on the text editing track segment, and presenting, in the text effect preview area, a second text effect after adjustment of the first text effect of the text material corresponding to the target text template.

Referring to FIG. 4, at least two first text effect editing options may be presented in the first text effect editing area of the first text editing interface, each first text effect editing option is associated with one piece of first text effect editing information, and a first text effect of the text material corresponding to the target text template on the text editing track segment may be adjusted using the first text effect editing information determined by the editing operation, so that the text material on the text editing track segment is adjusted from the first text effect to the second text effect. Meanwhile, the text material corresponding to the target text template may also be presented in the text effect preview area according to the adjusted second text effect of the text material.

In the above manner, with the text template being selected on the first text editing interface and with text effect editing information being formed for the text material in the selected text template, the text template may be presented on the text effect preview area based on the selected text template. After the target text template is edited in the first text effect editing area, the text effect of the text material in the text template may be adjusted by adding the text effect editing information on the basis of the already-presented text template, and thus be presented in the text effect preview area. The selection of the text template and the editing process of partial text effects are fused and performed in the first text editing interface, and the text effect is edited without jumping to other editing interfaces, thereby reducing the operation path of text editing, improving quick editing of the text effect of the text material while ensuring the high distribution efficiency of the text templates, and improving the efficiency of video clipping at the mobile end.

As an optional but non-limiting implementation, the first text effect editing option to be presented by the first text effect editing area is obtained by pre-screening from candidate text effect editing options based on the usage frequency of the candidate text effect editing options, and the candidate text effect editing options are used for editing the text material corresponding to the text template to form a text effect.

Referring to FIG. 4, since there are many types of text effect editing options which can be used for modifying the text effect of the text material in the text template, it is very difficult to put all the text effect editing options and selection of the text templates in a limited interface. For this reason, it is possible to first determine which candidate text effect editing options are used for editing the text material in the text template, and pre-screen from the candidate text effect editing options according to the use frequency of the candidate text effect editing options to obtain the first text effect editing option, and thereby take the first text effect editing option as the text effect editing option needed to perform preliminary editing for the text effect of the text material in the selected text template and present the first text effect editing option in the first text effect editing area for text effect quick editing, thereby preventing the quick editing area from becoming larger due to a large number of text effect editing options, and causing the text template not to be well presented due to an insufficient template distribution area in the limited interface area.

As an optional but non-limiting implementation, the text template selection area and the first text effect editing area are configured in the same overlay layer, and displayed in combination with the text effect preview area in the form of an overlay layer to form the first text editing interface of the text editing track segment.

Referring to FIG. 3 and FIG. 4, in order to implement the selection of the text template and quick editing and generation of the text effect of the text material corresponding to the text template, the first text editing interface including the text template selection area as well as the first text effect editing area may be presented in a manner of an overlay layer, the overlay layer may be a carrier used when the first text editing interface of the text editing track is opened. The first text editing interface can complete a prompt-like task or context-related task. The overlay layer may be formed in the form of a "floating layer", a "pop-up layer" or a "pop-up box" when the first text editing interface is presented.

Referring to FIG. 4, a plurality of text template options for selecting a style of the text template are presented in a text template selection area, each text template option is associated with a text template in a style, and each text template option may be selected by being triggered. A plurality of text effect editing options for preliminarily editing the text effect of the text material in the text template are presented in the text effect editing area, each text effect editing option is associated with a text effect, and each text effect editing option may be selected by being triggered, to enable adjustment of the text effect of the text material.

As an optional but non-limiting implementation, the first text effect editing option to be presented in the first text effect editing area on the first text editing interface may comprise text effect editing options for achieving text effect adjustment on the text material corresponding to the text template such as performing matched color addition and modification, performing font size adjustment on the text material corresponding to the text template, performing background addition and modification on the text material corresponding to the text template, performing stroke on the text material corresponding to the text template and/or performing typesetting adjustment on the text material corresponding to the text template, etc. The text effect editing options may each be presented in the form of an option identifier.

As an optional but non-limiting implementation, at least part of the first text effect editing options to be presented by the first text effect editing area are in an invisible state and at least part of the first text effect editing options are in a visible state. Furthermore, when the first text effect editing options in the visible state are triggered to slide, the first text effect editing options in the invisible state are adjusted to the visible state.

Referring to FIG. 4, there might be a large number of text effect editing options which are used for editing the text effect of the text material which and presented in the first text effect editing area on the first text editing interface, and the first text effect editing area occupies a small proportion in the first text editing interface, and it is very difficult to fully present all the first text effect editing options on the first text editing interface; therefore, the first text effect editing options to be presented on the first text editing interface may be configured in a way that at least part of the first text effect editing options are in a hidden invisible state, whereas another portion of the first text effect editing options are in an apparently visible state.

Referring to FIG. 4, when a triggering slide is performed on the first text effect editing options appearing on the first text editing interface through a triggering operation, identifiers corresponding to the at least part of the first text effect editing options in the hidden invisible state on the first text editing interface are adjusted to the apparently visible state, whereas identifiers corresponding to the part of the first text effect editing options in the visible state on the first text editing interface may be adjusted to the hidden invisible state.

As an optional but non-limiting implementation, the video editing method of the present embodiment may comprise the following steps A1-A2:

Step A1: in response to a triggering operation on the selected target text template in the text template selection area, presenting a second text editing interface; the second text editing interface comprises a text effect preview area and a second text effect editing area, wherein the second text effect editing area is used for presenting a second text effect editing option, and the text effect preview area is used for presenting a text effect of a text template.

Referring to FIG. 3 and FIG. 4, after a target text template option is selected in the text template selection area, an operation identifier for performing fine editing on a text material corresponding to the target text template is presented at the selected target text template option. When the second text effect formed by editing the target text template in the first text editing interface does not satisfy requirements, the selected target text template option continues to be triggered.

Figure 5:
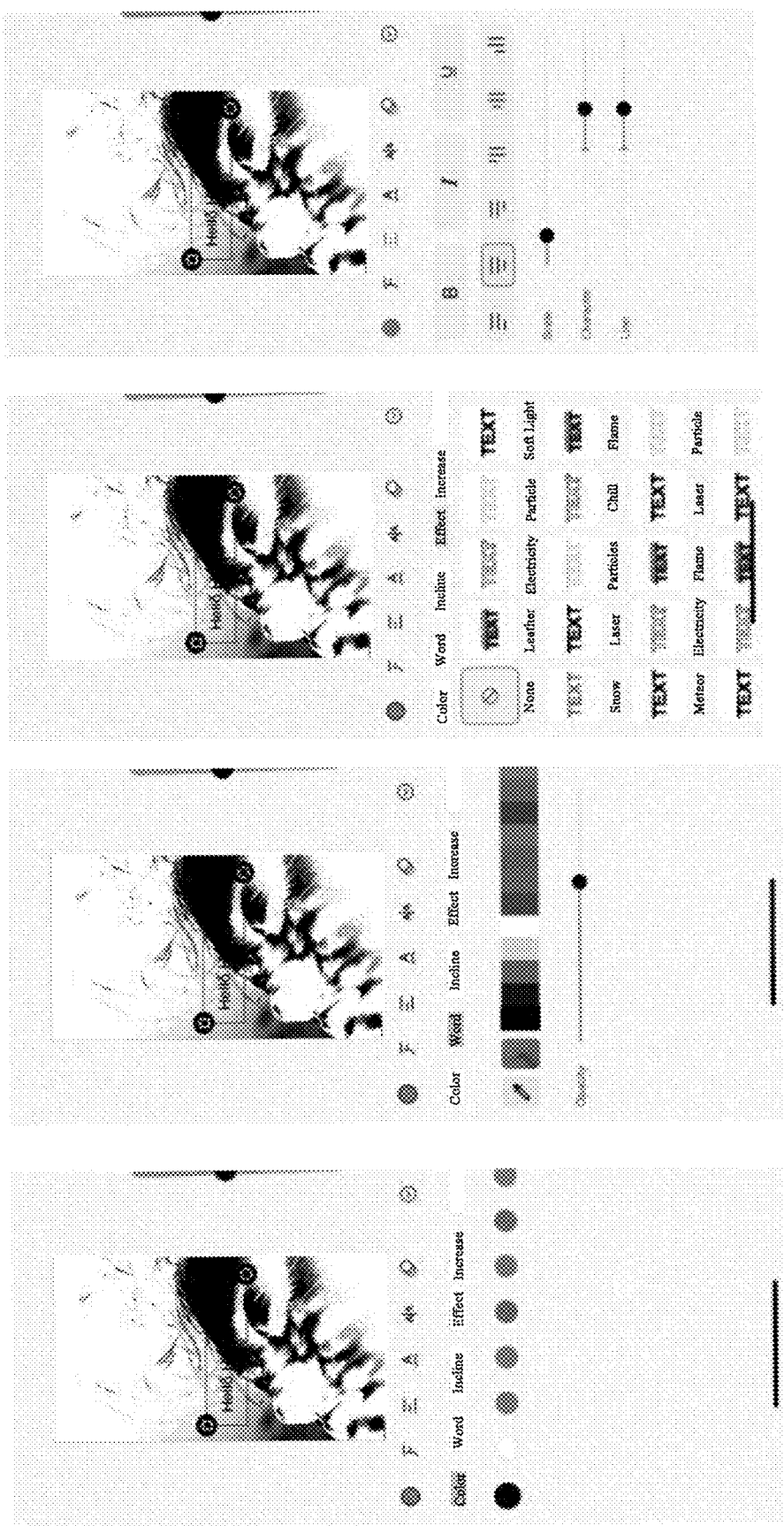
FIG. 5 is a schematic diagram of an interface for fine editing of text content in a video editing process to which embodiments of the present disclosure are applicable.

Referring to FIG. 5, the second text editing interface comprising the text effect preview area and the second text effect editing area is displayed through the triggering operation on the selected target text template, so that the second text editing interface may be used to perform further fine editing on the basis that the text material corresponding to the target text template has the second text effect, and the text effect of the text material corresponding to the target text template is improved to be closer to a desired text effect.

Optionally, after the target text template in the text template selection area on the first text editing interface is selected, the target text template is configured to allow triggering of the target text template to present the second text editing interface including the second text effect editing option.

Step A2: in response to an editing operation on the target text template in the second text effect editing area, adjusting the second text effect of the text material corresponding to the target text template placed on the text editing track segment, and presenting, in the text effect preview area, a third text effect after the second text effect of the text material corresponding to the target text template is adjusted.

Referring to FIG. 5, at least two second text effect editing options may be presented in the second text effect editing area of the second text editing interface, and each of the second text effect editing options is associated with one piece of second text effect editing information; the second text effect of the text material corresponding to the target text template on the text editing track segment may be adjusted on the basis of the second text effect of the text material by using the second text effect editing information determined by the editing operation, so that the text material on the text editing track segment is finely adjusted from the second text effect to the third text effect. Meanwhile, the text material corresponding to the target text template may also be presented in the text effect preview area according to the adjusted third text effect of the text material.

As known from the above depictions, since the second text editing interface begins to be used to perform fined editing only when the text effect of the text material corresponding to the text template does not meet requirements, when the text effect of the text material corresponding to the text template meets the requirements, only the first text editing interface is needed to implement the text effect editing and forming of the text material, thereby preventing the operation path for the text effect editing from becoming longer and ensuring quick editing of the text upon a high distribution efficiency of the text template.

As an optional but non-limiting implementation, the second text effect editing area replaces the text template selection area and the first text effect editing area in the first text editing interface in the form of an overlay layer, and is displayed in combination with the text effect preview area in the first text editing interface to form the second text editing interface.

Referring to FIG. 3 and FIG. 5, in order to achieve the further fine editing generation of the text effect of the text material corresponding to the text template, the second text editing interface including the second text effect editing area may be shown in a manner of an overlay layer. The overlay layer may be a carrier used when the second text editing interface of the text editing track is opened, and the second text editing interface can complete a prompt-like task or context-related task.

Referring to FIG. 3 and FIG. 5, a plurality of second text effect editing options formed for performing fine editing on the text effect of the text material in the text template are configured and presented on the second text effect editing area of the second text editing interface, each of the second text effect editing options is associated with a text effect for performing fine editing on the text content, and each of the second text effect editing options may perform fine adjustment on the text effect of the text material through selection by a click-trigger.

As an optional but non-limiting implementation, the second text effect editing options to be presented by the second text effect editing area are at least partial text effect editing options among candidate text effect editing options except for the first text effect editing options, and the second text effect editing options to be presented by the second text effect editing area are partially identical with or completely different from the first text effect editing options to be presented by the first text effect editing area.

Referring to FIG. 3 and FIG. 5, the remaining text effect editing options in the candidate text effect editing options except for the first text effect editing options and part of the first text effect editing options may be presented in the second text effect editing area as the second text effect editing options for performing fine editing and forming for the text effect of the text material in the text template, thereby providing more fine editing options on the editing of the text material in the text template, and realizing more text effects.

As an optional but non-limiting implementation, at least part of the first text effect editing options to be presented by the first text effect editing area are used more frequently than the second text effect editing options to be presented by the second text effect editing area.

As an optional but non-limiting implementation, the second text effect editing options to be presented by the second text effect editing area are configured to be presented in groups on the second text effect editing area according to groups to which the second text effect editing options belong.

With reference to FIG. 3 and FIG. 5, since there are a plurality of types of second text effect editing options to be presented in the second text effect editing area, it is very difficult to simultaneously display all the second text effect editing options in the limited second text editing interface; therefore, the second text effect editing options may be grouped according to the types of the second text effect editing options: with the second text effect editing options being grouped, operation identifiers corresponding to the second text effect editing options may be presented on the second text editing interface according to the difference of the groups to which the second text effect editing options belong.

Optionally, with reference to FIG. 5, the second text effect editing options to be presented in the second text effect editing area may comprise operation identifiers achieving adjustment of the second text effect editing options, such as performing at least partial combinations and adjustments of bold, italic, underline and typesetting of the text material corresponding to the text template, performing partial combinations and adjustments of one-key capitalization, ordered arrangement and arrangement of the text material corresponding to the text template, performing addition and modification of a bending function of the text material corresponding to the text template, performing row and column adjustment on the text material corresponding to the text template and/or performing combined color adjustment on the text material corresponding to the text template, so as to realize the fine editing of the text material (such as words) corresponding to the text template.

As an optional but non-limiting implementation, the video editing method of the present embodiment may comprise the following process: presenting a preset text in a text box of the text effect preview area: in response to an input operation of triggering the input of text content into the text box, obtaining and editing the input text content and replacing the preset text in the text box.

Figure 6:
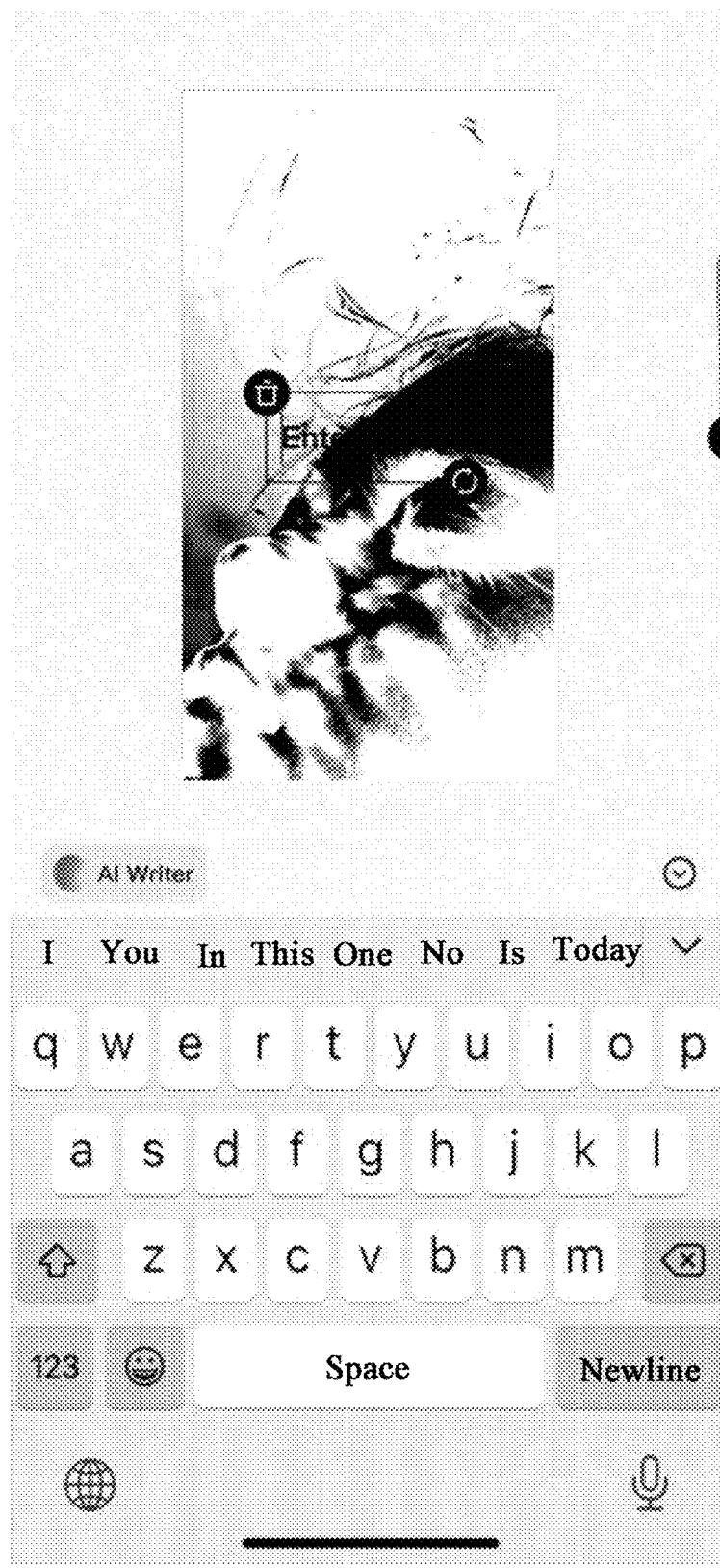
FIG. 6 is a schematic diagram showing input of text content into a text template in a video editing process to which embodiments of the present disclosure are applicable.

Referring to FIG. 3 and FIG. 6, after the target text template is selected in the first text editing interface, a text box is displayed in the text effect preview area according to the selected target text template, and a preset text may be preset in the text box. The input of the text content may be triggered in the text box through the input operation for triggering the input of the text content into the text box, the text content input may be obtained and edited, and then the input text content may be used to replace the preset text in the text box and the text content input May be displayed in the text box.

Referring to FIG. 3 and FIG. 4, the text box displayed in the text effect preview area is associated with a plurality of operation identifiers for adjusting the text content in the text box, such as an operation identifier for inputting the text content into the text box, an operation identifier for deleting the text box, and an operation identifier for rotating the text box.

Optionally, a text content editing input area for inputting the text content into the text box is presented in response to a triggering operation for inputting the text content into the text box. When the operation identifier for triggering the input of the text content into the text box, the text content editing input area for inputting the text content into the text box is presented in response to the triggering operation of the text box, for example, a pop-up window comprising the text content editing input area may be popped up, and the text content to be input is edited through the text content editing input area.

As an optional but non-limiting implementation, the video editing method of the present embodiment may comprise: generating a video based on the video editing track segment and the text editing track segment on the editing track of the video editing interface.

Optionally, the video editing track segments and the text editing track segments on the editing track may be combined into a video with a text effect in an arrangement order of the text editing track segments placed on the editing track of the video editing interface.

According to the embodiments of the present disclosure, with the selection of the text template and the editing process of partial text effects being performed in the first text editing interface in a fused manner, when the text effect meets the requirements and finer text effect editing needn't be performed, the text material on the text editing track may be directly used for video generation, and it is unnecessary to jump to other editing interfaces to edit the text effect, thereby reducing the operation path of text editing, improving quick editing of the text effect of the text material while ensuring the high distribution efficiency of the text templates, and improving the efficiency of video clipping at the mobile end.

Figure 7:
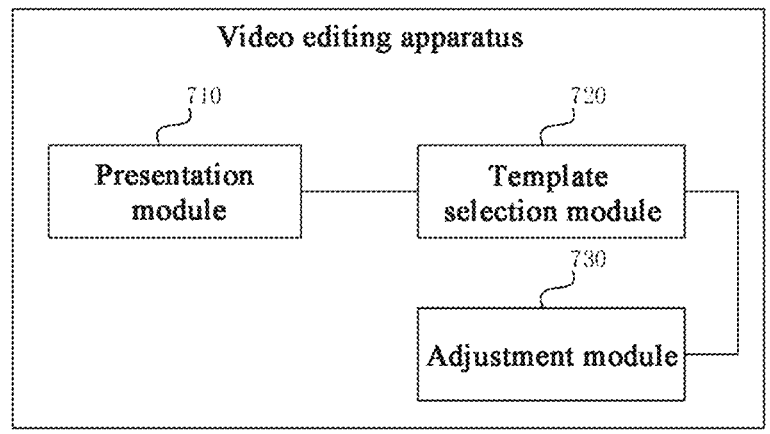
FIG. 7 is a structural schematic diagram of a video editing apparatus according to an embodiment of the present disclosure.

FIG. 7 is a structural schematic diagram of a video editing apparatus according to an embodiment of the present disclosure. Embodiments of the present disclosure are applicable to a case where video clipping is performed by adding a text caption to a video material, and the apparatus may be implemented in the form of software and/or hardware, and the video editing apparatus may be implemented by being configured in any electronic device with a network communication function, and the electronic device may be a mobile end, a PC terminal or a server, etc.

As shown in FIG. 7, the video editing apparatus of the present embodiment may comprise: a presentation module 710, a template selection module 720, and an adjustment module 730. Wherein:

The presentation module 710 is configured to, in response to a triggering operation on a text editing track segment in an editing track on a video editing interface, present a first text editing interface of the text editing track segment: wherein the first text editing interface comprises a text effect preview area, a text template selection area and a first text effect editing area: the text template selection area is used for presenting text template options, the first text effect editing area is used for presenting first text effect editing options, and the text effect preview area is used for presenting a text effect of the text template.

The template selection module 720 is configured to, in response to an operation of selecting a target text template in the text template selection area, place a text material corresponding to the target text template in the text editing track segment, and present a first text effect of the text material corresponding to the target text template in the text effect preview area.

The adjustment module 730 is configured to, in response to the editing operation on the target text template in the first text effect editing area, adjust the first text effect of the text material corresponding to the target text template placed on the text editing track segment, and present, in the text effect preview area, a second text effect after adjustment of the first text effect of the text material corresponding to the target text template.

On the basis of the above embodiment, optionally, the apparatus further comprises:

The adjustment module 730 configured to, in response to a triggering operation on the selected target text template in the text template selection area, present a second text editing interface; the second text editing interface comprises a text effect preview area and a second text effect editing area, wherein the second text effect editing area is used for presenting a second text effect editing option, and the text effect preview area is used for presenting a text effect of a text template:

The adjustment module 730 configured to, in response to an editing operation on the target text template in the second text effect editing area, adjust the second text effect of the text material corresponding to the target text template placed on the text editing track segment, and present, in the text effect preview area, a third text effect after the second text effect of the text material corresponding to the target text template is adjusted.

On the basis of the above embodiment, optionally, the triggering operation on a text editing track segment in an editing track on a video editing interface is specifically:

An operation of triggering a new text creation operation to create a blank text editing track segment on the video editing interface; or, An operation of triggering an already-existing text editing track segment on the video editing interface to perform text editing.

On the basis of the above embodiment, optionally, the apparatus further comprises:

in response to an operation of adjusting the text editing track segment in the editing track on the video editing interface, adjusting a text editing track starting point and a text editing track ending point corresponding to the text editing track segment.

On the basis of the above embodiment, optionally, the first text effect editing option to be presented by the first text effect editing area is obtained by pre-screening from candidate text effect editing options based on the usage frequency of the candidate text effect editing options, and the candidate text effect editing options are used for editing the text material corresponding to the text template to form a text effect.

On the basis of the above embodiment, optionally, the text template selection area and the first text effect editing area are configured in the same overlay layer, and are displayed in combination with the text effect preview area in the form of an overlay layer to form the first text editing interface.

On the basis of the above embodiment, optionally, at least part of the first text effect editing options to be presented by the first text effect editing area are in an invisible state and at least part of the first text effect editing options are in a visible state: when the first text effect editing options in the visible state are triggered to slide, the first text effect editing options in the invisible state are adjusted to the visible state.

On the basis of the above embodiment, optionally, the second text effect editing area replaces the text template selection area and the first text effect editing area in the first text editing interface in the form of an overlay layer, and is displayed in combination with the text effect preview area in the first text editing interface to form the second text editing interface.

On the basis of the above embodiment, optionally, the second text effect editing options to be presented by the second text effect editing area are at least partial text effect editing options among candidate text effect editing options except for the first text effect editing options, and the second text effect editing options to be presented by the second text effect editing area are partially identical with or completely different from the first text effect editing options to be presented by the first text effect editing area.

On the basis of the above embodiment, optionally, at least part of the first text effect editing options to be presented by the first text effect editing area are used more frequently than the second text effect editing options to be presented by the second text effect editing area.

On the basis of the above embodiment, optionally, after the target text template in the text template selection area is selected, the target text template is configured to allow triggering of the target text template to present the second text editing interface including the second text effect editing option.

On the basis of the above embodiment, optionally, the second text effect editing options to be presented by the second text effect editing area are configured to be presented in groups on the second text effect editing area according to groups to which the second text effect editing options belong.

On the basis of the above embodiment, optionally, the apparatus further comprises:

Presenting a preset text in a text box of the text effect preview area:

In response to an input operation of triggering the input of text content into the text box, obtaining and editing the input text content and replacing the preset text in the text box.

On the basis of the above embodiment, optionally, the apparatus further comprises:

Presenting a text content editing input area for inputting the text content into the text box in response to a triggering operation for inputting the text content into the text box.

On the basis of the above embodiment, optionally, the apparatus further comprises:

Generating a video based on the video editing track segment and the text editing track segment on the editing track of the video editing interface.

On the basis of the above embodiment, optionally; the generating a video based on the video editing track segment and the text editing track segment on the editing track of the video editing interface comprises:

Combining the video editing track segments and the text editing track segments on the editing track into a video with a text effect in an arrangement order of the text editing track segments placed on the editing track of the video editing interface.

According to the embodiments of the present disclosure, with the selection of the text template and the editing process of partial text effects being performed in the first text editing interface in a fused manner, when the text effect meets the requirements and finer text effect editing needn't be performed, the text material on the text editing track may be directly used for video generation, and it is unnecessary to jump to other editing interfaces to edit the text effect, thereby reducing the operation path of text editing, improving quick editing of the text effect of the text material while ensuring the high distribution efficiency of the text templates, and improving the efficiency of video clipping at the mobile end.

The video editing apparatus provided by an embodiment of the present disclosure may execute the video editing method provided by any embodiment of the present disclosure, and has corresponding functional modules and advantageous effects for executing the video editing method.

It should be noted that the various units and modules included in the above-mentioned apparatus are merely classified according to functional logic, but are not limited to the forgoing classified as long as corresponding functions can be realized: in addition, specific names of the functional units are also for the convenience of distinguishing each other and are not intended to limit the scope of the embodiments of the present disclosure.

Figure 8:
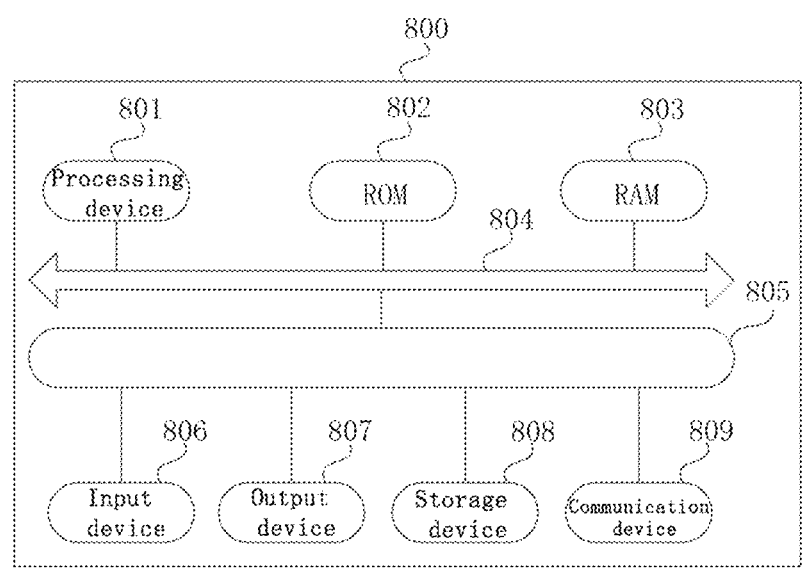
FIG. 8 is a block diagram of an electronic device for implementing a video editing method according to an embodiment of the present disclosure.

FIG. 8 is a schematic structural diagram of an electronic device according to an embodiment of the present disclosure. Reference is now made to FIG. 8, which illustrates a structural schematic diagram of an electronic device 800 (e.g., a terminal device or a sever in FIG. 8) suitable for implementing embodiments of the present disclosure. The terminal device in embodiments of the present disclosure may comprise, but not limited to, mobile ends such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 8 is merely an example and should not impose any limitations on the functionality and scope of use of embodiments of the present disclosure.

As shown in FIG. 8, the electronic device 800 may comprise a processing device (e.g., a central processing unit, a graph processor, etc.) 801 that may perform various suitable actions and processes in accordance with a program stored in a read only memory (ROM) 802 or a program loaded from a storage device 808 into a random access memory (RAM) 803. In the RAM 803, various programs and data needed by the operation of the electronic device 800 are also stored. The processing device 801, the ROM 802, and the RAM 803 are connected to each other via a bus 804. An input/output (I/O) interface 805 is also coupled to bus 804.

In general, the following devices may be connected to the I/O interface 805: an input device 806 including, for example, a touch screen, a touch pad, a keyboard, a mouse, a camera, a microphone, an accelerometer, a gyroscope, etc.; an output device 807 including, for example, a liquid crystal display (LCD), a speaker, a vibrator, etc.; a storage device 808 including, for example, a magnetic tape, a hard disk, etc.; and a communication device 809. The communication device 809 may allow the electronic device 800 to communicate in a wireless or wired manner with other devices to exchange data. While FIG. 8 illustrates the electronic device 800 having various devices, it is to be understood that not all illustrated devices are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure comprise a computer program product comprising a computer program carried on a computer-readable medium, the computer program comprising program code for performing the method illustrated by the flow charts. In such embodiments, the computer program may be downloaded and installed from a network via the communication device 809, or installed from the storage device 808, or installed from the ROM 802. When the computer program is executed by the processing device 801, the above-described functions defined in the method of the embodiments of the present disclosure are performed.

The names of messages or information interacted between devices in embodiments of the present disclosure are for illustrative purposes only and are not intended to limit the scope of such messages or information.

The electronic device provided by the present embodiment of the present disclosure and the video editing method provided by the above embodiment belong to the same inventive concept. Reference may be made to the above embodiment for technical details not described in detail in the present embodiment. Furthermore, the present embodiment and the above embodiment have the same advantageous effects.

Embodiments of the present disclosure provide a computer storage medium on which a computer program is stored, the program, when executed by a processor, implementing the video editing method provided by the above embodiment.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable. RF (radio frequency), and the like, or any suitable combinations thereof.

In some embodiments, the client and the server may communicate using any currently known or future-developed network protocol, such as HTTP (HyperText Transfer Protocol), and may be interconnected with any form or medium of digital data communication (e.g., a communication network). Examples of the communication network comprise local area networks ("LANs"), wide area networks ("WANs"), international networks (e.g., the Internet), and peer-to-peer networks (e.g., ad hoc peer-to-peer networks), as well as any currently known or future-developed networks.

The computer readable medium may be contained in the above-described electronic device; it may also be present separately and not installed into the electronic device.

The above-mentioned computer-readable medium carries one or more programs. When the above-mentioned one or more programs are executed by the electronic device, the electronic device:

The computer-readable medium carries one or more programs that, when executed by the terminal device, cause the terminal device to perform the following: in response to a triggering operation on a text editing track segment in an editing track on a video editing interface, present a first text editing interface of the text editing track segment; wherein the first text editing interface comprises a text effect preview area, a text template selection area and a first text effect editing area; the text template selection area is used for presenting text template options, the first text effect editing area is used for presenting first text effect editing options, and the text effect preview area is used for presenting text effects of the text template; in response to an operation of selecting a target text template in the text template selection area, place a text material corresponding to the target text template in the text editing track segment, and present a first text effect of the text material corresponding to the target text template in the text effect preview area; in response to the editing operation on the target text template in the first text effect editing area, adjust the first text effect of the text material corresponding to the target text template placed on the text editing track segment, and present, in the text effect preview area, a second text effect after adjustment of the first text effect of the text material corresponding to the target text template.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special-purpose hardware and computer instructions.

The units described in connection with the embodiments disclosed herein may be implemented in a software or hardware manner. The names of the units do not constitute limitations of the units themselves in a certain case. For example, the first acquisition unit may further be described as "a unit for obtaining at least two internet protocol addresses".

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electro-magnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also comprise other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A video editing method, wherein the method comprises:
   in response to a triggering operation on a text editing track segment in an editing track on a video editing interface, presenting a first text editing interface of the text editing track segment, wherein the first text editing interface comprises a text effect preview area, a text template selection area and a first text effect editing area; the text template selection area is used for presenting text template options, the first text effect editing area is used for presenting first text effect editing options, and the text effect preview area is used for presenting a text effect of the text template;
   in response to an operation of selecting a target text template in the text template selection area, placing a text material corresponding to the target text template in the text editing track segment, and presenting a first text effect of the text material corresponding to the target text template in the text effect preview area;
   in response to editing operation on the target text template in the first text effect editing area, adjusting the first text effect of the text material corresponding to the target text template placed on the text editing track segment, and presenting, in the text effect preview area, a second text effect after adjustment of the first text effect of the text material corresponding to the target text template;
   in response to a triggering operation on the selected target text template in the text template selection area, presenting a second text editing interface; the second text editing interface comprises a text effect preview area and a second text effect editing area, wherein the second text effect editing area is used for presenting a second text effect editing option, and the text effect preview area is used for presenting a text effect of a text template; and
   in response to an editing operation on the target text template in the second text effect editing area, adjusting the second text effect of the text material corresponding to the target text template placed on the text editing track segment, and presenting, in the text effect preview area, a third text effect after the second text effect of the text material corresponding to the target text template is adjusted.

2. The method of claim 1, wherein triggering operation on a text editing track segment in an editing track on the video editing interface comprises:
   an operation of triggering a new text creation operation to create a blank text editing track segment on the video editing interface; or
   an operation of triggering an already-existing text editing track segment on the video editing interface to perform text editing.

3. The method of claim 2, wherein the method further comprises:
   in response to an operation of adjusting the text editing track segment in the editing track on the video editing interface, adjusting a text editing track starting point and a text editing track ending point corresponding to the text editing track segment.

4. The method of claim 1, wherein the first text effect editing option to be presented by the first text effect editing area is obtained by pre-screening from candidate text effect editing options based on the usage frequency of the candidate text effect editing options, and the candidate text editing options are used for editing the text material corresponding to the text template to form a text effect.

5. The method of claim 1, wherein the text template selection area and the first text effect editing area are configured in the same overlay layer, and are displayed in combination with the text effect preview area in a form of an overlay layer to form the first text editing interface.

6. The method of claim 1, wherein at least part of the first text effect editing options to be presented by the first text effect editing area are in an invisible state and at least part of the first text effect editing options are in a visible state; when the first text effect editing options in the visible state are triggered to slide, the first text effect editing options in the invisible state are adjusted to the visible state.

7. The method of claim 1, wherein the second text effect editing area replaces the text template selection area and the first text effect editing area in the first text editing interface in a form of an overlay layer, and is displayed in combination with the text effect preview area in the first text editing interface to form the second text editing interface.

8. The method of claim 1, wherein the second text effect editing options to be presented by the second text effect editing area are at least partial text effect editing options among candidate text effect editing options except for the first text effect editing options, and the second text effect editing options to be presented by the second text effect editing area are partially identical with or completely different from the first text effect editing options to be presented by the first text effect editing area.

9. The method of claim 1, wherein at least part of the first text effect editing options to be presented by the first text effect editing area are used more frequently than the second text effect editing options to be presented by the second text effect editing area.

10. The method of claim 1, wherein after the target text template in the text template selection area is selected, the target text template is configured to allow triggering of the target text template to present the second text editing interface including the second text effect editing option.

11. The method of claim 1, wherein the second text effect editing options to be presented by the second text effect editing area are configured to be presented in groups on the second text effect editing area according to groups to which the second text effect editing options belong.

12. The method of claim 1, wherein the method further comprises:
   presenting a preset text in a text box of the text effect preview area; and
   in response to an input operation of triggering the input of text content into the text box, obtaining and editing the input text content and replacing the preset text in the text box.

13. The method of claim 12, wherein the method further comprises:
   presenting a text content editing input area for inputting the text content into the text box in response to a triggering operation for inputting the text content into the text box.

14. The method of claim 1, wherein the method further comprises:
   generating a video based on the video editing track segment and the text editing track segment on the editing track of the video editing interface.

15. The method of claim 14, wherein generating a video based on the video editing track segment and the text editing track segment on the editing track of the video editing interface comprises:
   combining the video editing track segments and the text editing track segments on the editing track into a video with a text effect in an arrangement order of the text editing track segments placed on the editing track of the video editing interface.

16. An electronic device, wherein the electronic device comprises:
   one or more processors;
   a storage device for storing one or more programs,
   the one or more programs, when executed by the one or more processors, cause the one or more processors to:
      in response to a triggering operation on a text editing track segment in an editing track on a video editing interface, present a first text editing interface of the text editing track segment, wherein the first text editing interface comprises a text effect preview area, a text template selection area and a first text effect editing area; the text template selection area is used for presenting text template options, the first text effect editing area is used for presenting first text effect editing options, and the text effect preview area is used for presenting a text effect of the text template;
      in response to an operation of selecting a target text template in the text template selection area, place a text material corresponding to the target text template in the text editing track segment, and presenting a first text effect of the text material corresponding to the target text template in the text effect preview area;
      in response to editing operation on the target text template in the first text effect editing area, adjust the first text effect of the text material corresponding to the target text template placed on the text editing track segment, and presenting, in the text effect preview area, a second text effect after adjustment of the first text effect of the text material corresponding to the target text template;
      in response to a triggering operation on the selected target text template in the text template selection area, present a second text editing interface; the second text editing interface comprises a text effect preview area and a second text effect editing area, wherein the second text effect editing area is used for presenting a second text effect editing option, and the text effect preview area is used for presenting a text effect of a text template; and
      in response to an editing operation on the target text template in the second text effect editing area, adjust the second text effect of the text material corresponding to the target text template placed on the text editing track segment, and presenting, in the text effect preview area, a third text effect after the second text effect of the text material corresponding to the target text template is adjusted.

17. The electronic device of claim 16, wherein triggering operation on a text editing track segment in an editing track on the video editing interface comprises:
   an operation of triggering a new text creation operation to create a blank text editing track segment on the video editing interface; or
   an operation of triggering an already-existing text editing track segment on the video editing interface to perform text editing.

18. A non-transitory storage medium containing computer-executable instructions, wherein the computer-executable instructions, when executed by a computer processor, causing the computer processor to:
   in response to a triggering operation on a text editing track segment in an editing track on a video editing interface, present a first text editing interface of the text editing track segment, wherein the first text editing interface comprises a text effect preview area, a text template selection area and a first text effect editing area; the text template selection area is used for presenting text template options, the first text effect editing area is used for presenting first text effect editing options, and the text effect preview area is used for presenting a text effect of the text template;
   in response to an operation of selecting a target text template in the text template selection area, place a text material corresponding to the target text template in the text editing track segment, and presenting a first text effect of the text material corresponding to the target text template in the text effect preview area;
   in response to editing operation on the target text template in the first text effect editing area, adjust the first text effect of the text material corresponding to the target text template placed on the text editing track segment, and presenting, in the text effect preview area, a second text effect after adjustment of the first text effect of the text material corresponding to the target text template;
   in response to a triggering operation on the selected target text template in the text template selection area, presenting a second text editing interface; the second text editing interface comprises a text effect preview area and a second text effect editing area, wherein the second text effect editing area is used for presenting a second text effect editing option, and the text effect preview area is used for presenting a text effect of a text template; and
   in response to an editing operation on the target text template in the second text effect editing area, adjusting the second text effect of the text material corresponding to the target text template placed on the text editing track segment, and presenting, in the text effect preview area, a third text effect after the second text effect of the text material corresponding to the target text template is adjusted.

\* \* \* \* \*